US009510046B2

(12) United States Patent
Henocq et al.

(10) Patent No.: US 9,510,046 B2
(45) Date of Patent: Nov. 29, 2016

(54) METHODS AND DEVICES FOR ESTIMATING A LEVEL OF USE OF A COMMUNICATION NETWORK AND FOR ADAPTING A LEVEL OF SUBSCRIPTION TO MULTICAST SESSIONS

(75) Inventors: Xavier Henocq, Melesse (FR); Fabrice Le Leannec, Mouaze (FR); Patrice Onno, Rennes (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 12/837,542

(22) Filed: Jul. 16, 2010

(65) Prior Publication Data
US 2011/0013538 A1    Jan. 20, 2011

(30) Foreign Application Priority Data
Jul. 20, 2009 (FR) .................................... 09 55017

(51) Int. Cl.
| H04N 21/442 | (2011.01) |
| H04L 12/26 | (2006.01) |
| H04N 19/33 | (2014.01) |
| H04N 21/2343 | (2011.01) |
| H04N 21/462 | (2011.01) |
| H04N 21/6405 | (2011.01) |
| H04N 19/70 | (2014.01) |
| H04N 19/34 | (2014.01) |

(52) U.S. Cl.
CPC .... *H04N 21/44209* (2013.01); *H04L 43/0894* (2013.01); *H04N 19/33* (2014.11); *H04N 19/70* (2014.11); *H04N 21/234327* (2013.01); *H04N 21/4621* (2013.01); *H04N 21/6405* (2013.01); *H04N 19/34* (2014.11)

(58) Field of Classification Search
None
See application file for complete search history.

(56) References Cited

U.S. PATENT DOCUMENTS

| 2006/0256851 | A1* | 11/2006 | Wang et al. ............. 375/240.01 |
| 2008/0117930 | A1* | 5/2008 | Chakareski et al. .......... 370/465 |
| 2009/0003439 | A1 | 1/2009 | Wang et al. ............. 375/240.08 |
| 2009/0089445 | A1* | 4/2009 | Deshpande ................... 709/231 |
| 2010/0053300 | A1* | 3/2010 | Einarsson et al. ......... 348/14.01 |
| 2010/0189063 | A1* | 7/2010 | Kokku et al. ................. 370/329 |
| 2011/0013514 | A1* | 1/2011 | Mahkonen .................... 370/235 |

OTHER PUBLICATIONS

Y. Wang et al., "System and Transport Interface of SVC", *IEEE Transactions on Circuits and Systems for Video Technology*, IEEE Service Center, Piscataway, N.J., vol. 17, No. 9, pp. 1149-1163, XP011193022 (Sep. 1, 2007).

(Continued)

*Primary Examiner* — Marcus R Smith
(74) *Attorney, Agent, or Firm* — Fitzpatrick, Cella, Harper & Scinto

(57) ABSTRACT

The invention in particular concerns a method and a device for estimating a level of use of a communication network linking a server and at least one client, said communication network being used to transmit a data stream at a transmission rate corresponding to the temporal frequency of said data stream, said data stream comprising at least one item of information characterizing a theoretical rate dependent on said transmission rate of said data stream. After having obtained (121) said theoretical rate of said data stream, the real reception rate of at least one part of said data stream is evaluated (109). Said theoretical rate and said evaluated rate are then compared (113) to estimate said level of use of said communication network. The level of subscription of a client to multicast sessions may be adapted according to the level of use of the communication network.

22 Claims, 7 Drawing Sheets

(56) References Cited

OTHER PUBLICATIONS

D. Tian et al., "Sub-Sequence Video Coding for Improved Temporal Scalability", *IEEE*, pp. 6074-6077, XP010816921 (May 23, 2005).

T. Schierl, et al., "Mobile Video Transmission Using Scalable Video Coding", *Transactions on Circuits and Systems for Video Technology*, IEEE Service Center, Piscataway, N.J., vol. 17, No. 9, pp. 1204-1217, XP011193018 (Sep. 1, 2007).

* cited by examiner

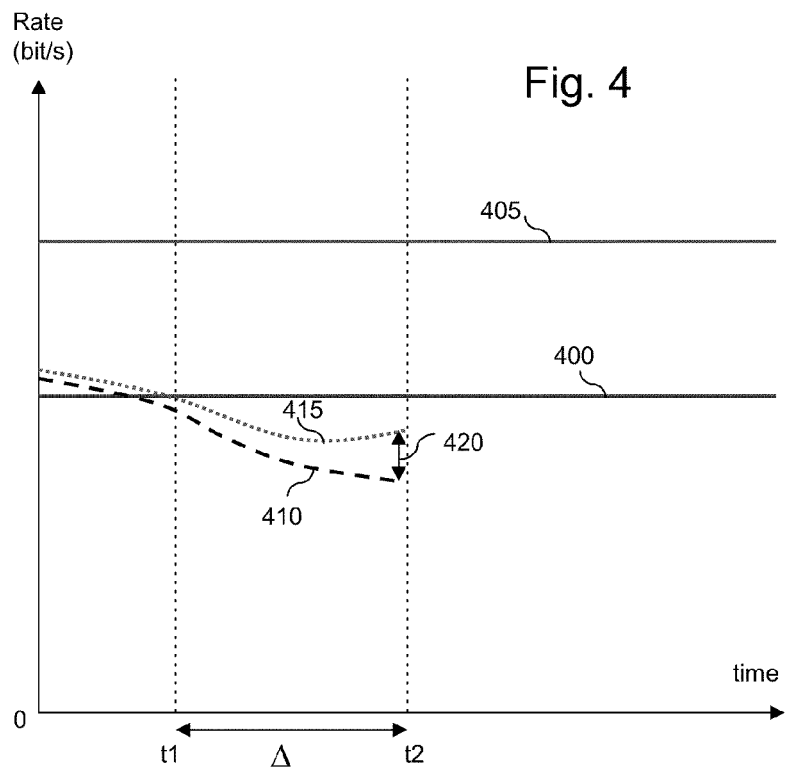
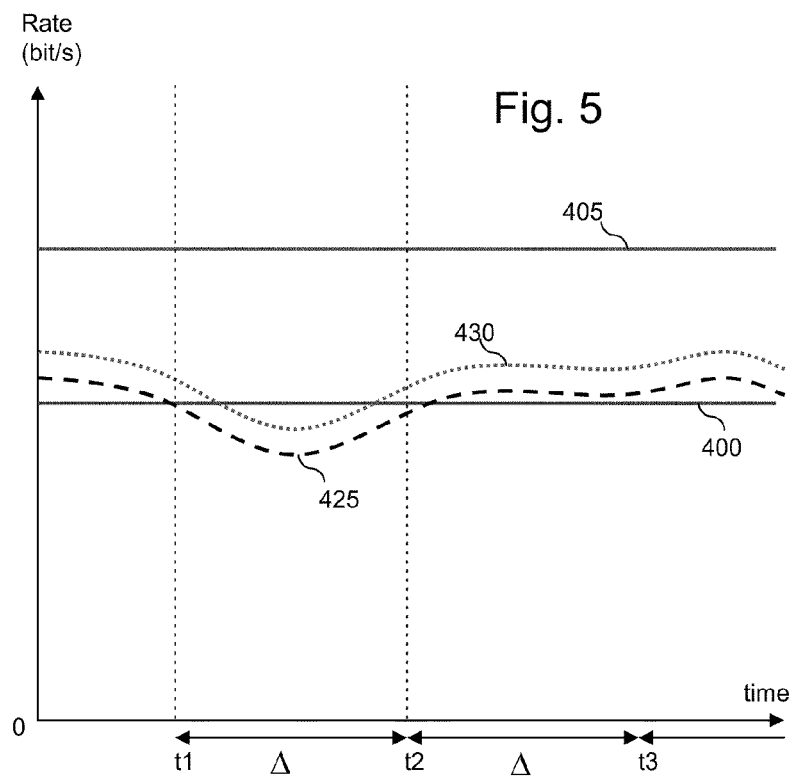

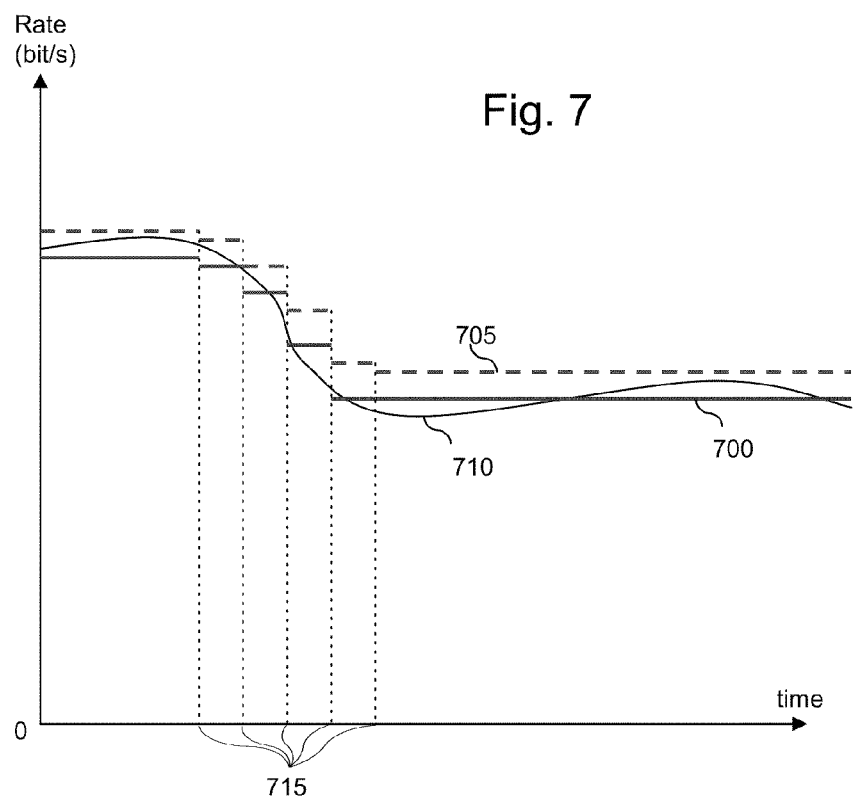
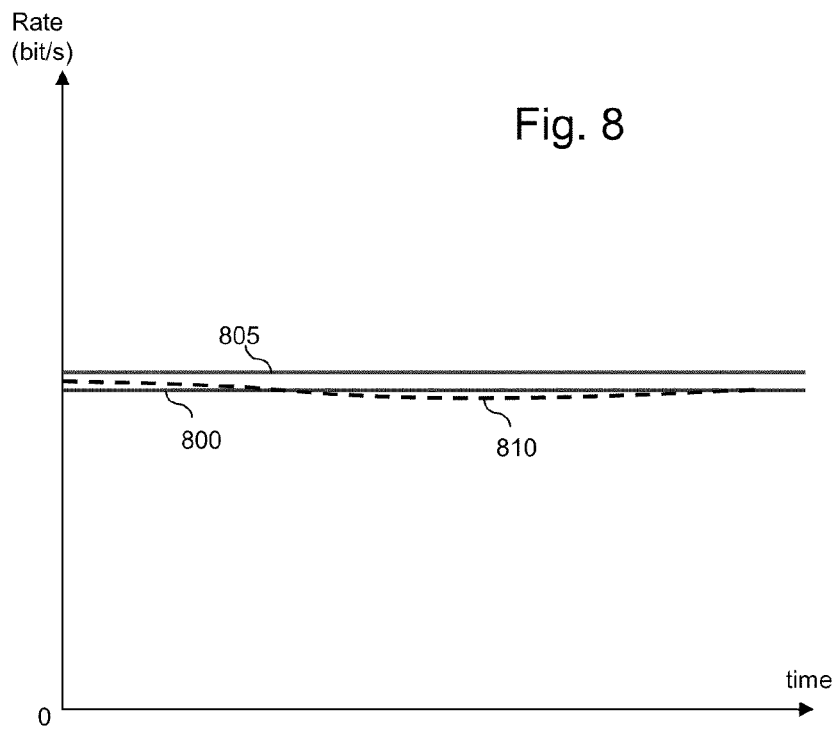

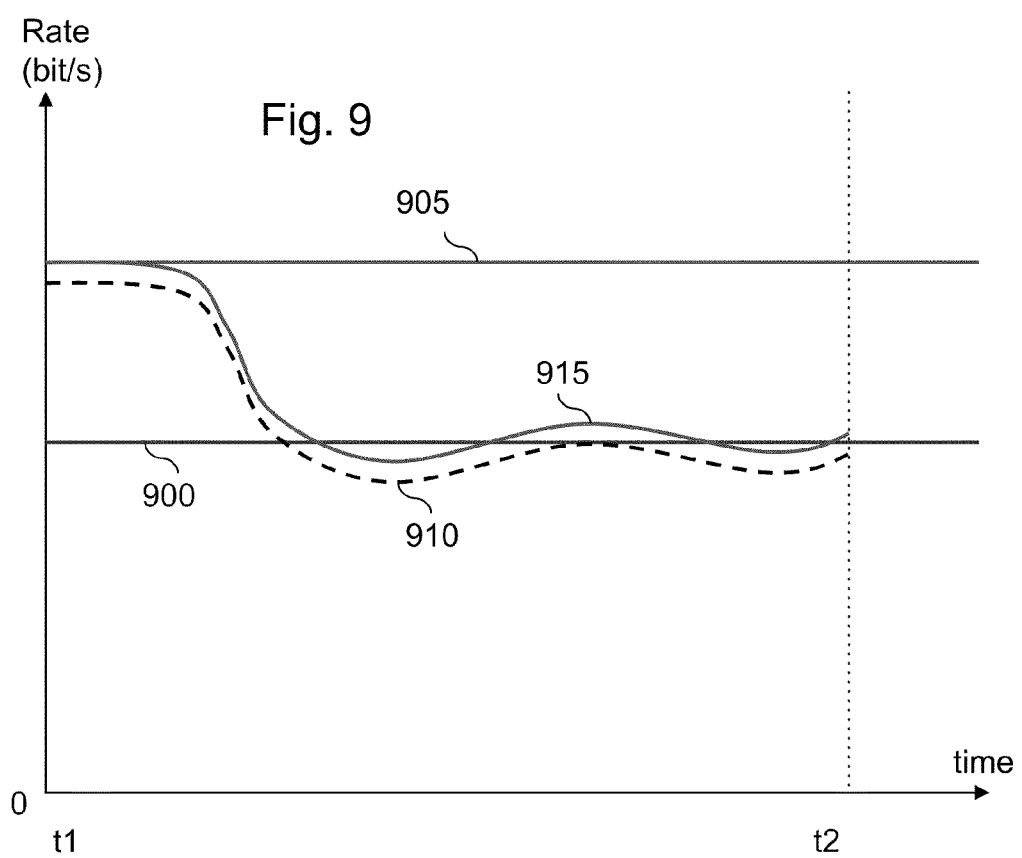

METHODS AND DEVICES FOR ESTIMATING A LEVEL OF USE OF A COMMUNICATION NETWORK AND FOR ADAPTING A LEVEL OF SUBSCRIPTION TO MULTICAST SESSIONS

RELATED APPLICATION

This application claims benefit under 35 U.S.C. §119 of French Patent Application 0955017, filed Jul. 20, 2009, the entire contents of which are incorporated herein by reference.

BACKGROUND OF THE INVENTION

The present invention concerns the transmission of data between a server and a client across a communication network and more particularly methods and devices for estimating a level of use of a communication network and for adapting a level of subscription to multicast sessions according to the level of use of the network.

The invention is situated in the context of the transmission of a data stream such as a video sequence between a server and at least one client over a communication network that is unreliable, that is to say in which the transmission conditions are not stable and in which data losses may occur. Such a communication network is for example the Internet network in which the data are transmitted by packets.

H.264/AVC (acronym for Advanced Video Coding) is a video compression standard providing good video quality for a relatively low throughput. It involves compression by blocks implementing algorithms for motion estimation and compensation. It was developed in order to be easy to use in a large number of applications and conditions.

An extension of the H.264/AVC standard is the SVC standard (SVC being an acronym for Scalable Video Coding) the object of which is to code a high quality video stream into a set of bitstreams comprising a basic stream and several enhancement streams which, when they are decoded with the basic stream, enhance the quality of that stream.

Such coding of video sequences is said to be hierarchical or "scalable", that is to say that it implements one or more hierarchical levels, also called scalability levels or layers.

Three types of scalability have been defined in the SVC standard: spatial, temporal and quality scalability, quality scalability also being known by the name SNR scalability (SNR being an acronym for Signal to Noise Ratio).

Temporal scalability enables the temporal resolution of a sequence to be modified (that is to say the number of frames per second represented by the coded data) by deleting certain images, this deletion taking into account the dependencies that may exist between the images.

Spatial scalability consists of inserting several spatial resolutions (corresponding to different numbers of pixels represented by the coded data) in a video stream, the lowest resolution being used for the prediction of the higher resolutions.

Quality scalability concerns three different forms: Coarse Grain Scalability or CGS, Medium Grain Scalability or MGS and Fine Grain Scalability or FGS. CGS uses the same concepts as spatial scalability, the only difference being that for CGS, the operations of upsampling of the inter-layer prediction are omitted. FGS enables a bitstream to be created which may be truncated at any point while remaining decodable. MGS has been defined as intermediate between CGS and FGS: it provides decoding points in the bitstream that are finer than CGS but does not enable truncation at any point like FGS. MGS is often considered as providing sufficient granularity for realistic network conditions.

The transmission of a video over a network is facilitated by the introduction of the concept of NAL unit (NAL being an acronym for Network Abstraction Layer). A NAL is an elementary unit for transfer of the bitstream which, in its header, provides description information on the data transported in the data part of the NAL.

All the NALs corresponding to the same point in time form an entity termed AU ("Access Unit").

Messages of SEI type (SEI being an acronym for Supplemental Enhancement Information) may be used to facilitate certain operations such as decoding and display. These messages are also transmitted in NAL form. Among these messages, there is in particular one called "scalability information SEI" of which the fields indicate scalability characteristics of the data stream in which the message is transmitted. In particular, such a message, called a scalability SEI message in the following description, may comprise information relative to the average rate linked to a scalability layer i, referenced Avg_bitrate[i], as well as information relative to the maximum rate linked to a scalability layer i of the SVC sequence concerned by the SEI message, referenced Max_bitrate_layer[i]. The presence of these items of information is flagged by an indicator denoted bitrate_info_present_flag[i].

The scalability layers are generally transmitted across a communication network, for example in packet form, in multicast sessions, enabling clients to subscribe to subscriptions to a set of multicast sessions, that is to say to join those sessions, according to their capabilities, in particular their reception, decoding, processing and display capabilities.

A problem linked to communication networks is the variation in their capacity. The bandwidth and the transmission error rate often vary depending on the behavior of clients but also independently of their behavior, in particular due to the traffic generated by other applications. If the applications using the network do not react appropriately according to its capacities, there is a risk of congestion which may cause the loss of packets, or, on the contrary, a possibility of under-use of the network.

It should be noted here that the loss of data in transmitted video streams induces errors in reconstructing the video data at the client devices. It is thus preferable to avoid the problems of congestion during their transmission.

The problems of congestion arise in particular when the buffer memories of a router are full. However, at the start of a congestion period, there is a period during which no packet is lost and during which particular characteristics may be identified. To be precise, when a packet is transmitted during that period, it is stored for a certain time in the router instead of being routed practically directly. There is thus an increase in the overall time spent by a packet in the network between the server and a client. The identification of this particular period makes it possible to anticipate the loss of packets and thus to react in consequence.

One solution for detecting a start of congestion, before packet loss occurs, consists of measuring a period of time called RTT (acronym for Round Trip Time) corresponding to the time taken by a packet to travel there and back between a server and a client. An increase in the RTT indicates congestion or a start of congestion. The RTT may be measured by transmitting a first packet, containing the time at which it is transmitted, from a client to a server. On reception of that first packet, the server sends the client a second packet, containing the time at which that first packet was sent and the time elapsed between the reception of the first packet and the transmission of the second, from the server to the client. On reception of that second packet, the client compares the time at which the first packet was transmitted with that of the reception of the second packet, while taking into account the time elapsed between the reception of the first packet and the transmission of the second.

Although this solution provides a good estimation of the RTT, and thus of congestion or a start of congestion, it nevertheless has the following two major drawbacks:

the necessity to implement tools at the server end making it possible to receive and send the packets that are used to measure the RTT as well as to measure the time between the reception of the first packets and the sending of the second packets; and, the lack of scalability (the solution becomes ineffective when the number of clients increases).

Other solutions are based on the time taken by a packet to reach a client as from its sending by the server. However, although these solutions may enable a start of congestion to be efficiently detected, they require synchronization between servers and clients.

Conversely, there are solutions for detecting an increase in the bandwidth. For example, when a client does not detect any packet loss, it may subscribe to a subscription to another multicast session to receive supplementary data in order to enhance the quality of the video received. This procedure may be repeated until the optimum bandwidth is identified, that is to say until the loss of packets is identified. However, such a solution necessarily leads to congestion to attain the optimum bandwidth.

Another solution consists of enabling the server to increase the transmission rate of the data and to measure the time needed to receive an acknowledgement of receipt linked to the reception of each packet by the client. When this time increases, the server stops increasing the transmission rate (it has reached the rate causing congestion). However, this solution requires specific tools at the server end to increase the transmission rate and measure the time linked to the reception of acknowledgements of receipt as well as the cooperation of the client who must sent acknowledgements of receipt for each packet received.

Consequently, there is a need to improve the transmission of scalable data streams across a communication network, between a server and a client, according to the available bandwidth.

SUMMARY OF THE INVENTION

The invention enables at least one of the problems set forth earlier to be solved.

More particularly, the invention provides a system for subscribing and unsubscribing to multicast sessions for transmission of scalable data according to the characteristics of the communication network that is used. To these ends, the system enables a client to measure the load or the level of use of the network to detect congestion before data are lost.

The invention thus concerns a method for a computer for estimating a level of use of a communication network linking a server and at least one client, said communication network being used to transmit a data stream at a transmission rate corresponding to the temporal frequency of said data stream, said data stream comprising at least one item of information characterizing a theoretical rate dependent on said transmission rate of said data stream, this method comprising the following steps implemented by said at least one client:

obtaining said theoretical rate of said data stream;

evaluating the real reception rate of at least one part of said data stream;

comparing said theoretical rate and said evaluated rate;

in response to said comparison, estimating said level of use of said communication network.

The method according to the invention thus enables a client to easily and efficiently evaluate the level of use of the communication network linking it to the server without requiring adaptation at the server end and without perturbing the communication network.

According to a particular embodiment, said step of comparing said theoretical rate and said evaluated rate comprises a step of analyzing the change in the difference between said theoretical rate and said evaluated rate, said change in the difference between said theoretical rate and said evaluated rate characterizing an adapted level of use of said communication network, under-use of said communication network or congestion of said communication network. The method according to the invention thus enables the client to know whether it can take advantage of more bandwidth or, on the contrary, whether it must give up bandwidth.

Said data stream is, preferably, a scalable data stream, it being possible for said theoretical rate to be determined according to a theoretical rate associated with each scalability layer of said data stream. The method according to the invention may thus use the data transmitted by a server to determine a theoretical rate without requiring supplementary information.

According to a particular embodiment, the method further comprises a step of correcting said at least one item of information characterizing said theoretical rate of said data stream in order to improve the estimation of the behavior of a communication network.

Said correcting step advantageously comprises a step of estimating, for a predetermined period of time, a theoretical instantaneous rate, said theoretical instantaneous rate being dependent on the content of said data stream received during said period of time. The method according to the invention thus rapidly adapts to the transmission conditions linked to the communication network.

Said correcting step is only carried out if the variance in the change of said theoretical rate is greater than a predetermined threshold in order to avoid calculations which would not really be useful.

According to a particular embodiment, the method further comprises a step of determining a state of said at least one client, said state of said at least one client being determined according to the variation in the difference between said theoretical rate and said evaluated rate and according to the variation in the number of said scalability layers of said data stream received by said at least one client, the method further comprising a step of transmitting an indication of said state of said at least one client to said server if said state of said at least one client is stable in order to indicate to said server to increase said transmission rate of said data stream in order for, preferably, said transmission rate of said data stream to be greater than the transmission rate corresponding to the temporal frequency of said data stream. The method according to the invention thus makes it possible to improve the detection of the increase in bandwidth.

Advantageously, the method further comprises a step of analyzing the change in said evaluated rate and a step of determining under-use of said communication network, said determining being based on the analysis of said state of said at least one client and on said analysis of said change of said evaluated rate. The method according to the invention thus makes it possible to rapidly and efficiently detect under-use of the communication network.

Still according to a particular embodiment, the method further comprises a step of determining a state of said at least one client, said state of said at least one client being determined according to the variation in the difference between said theoretical rate and said evaluated rate and according to the variation in the number of said scalability layers of said data stream received by said at least one client, the method further comprising, if said state of said at least one client is stable, the following steps:

comparing said theoretical rate with at least one reception rate of at least one part of said data stream evaluated over at least one past period of time; and, determining under-use of said communication network if said at least one reception rate of at least one part of said data stream evaluated over at least one past period of time is greater than said theoretical rate.

The method according to the invention thus makes it possible to avoid involving the server while enabling the detection of the increase in bandwidth to be improved.

The invention also concerns a method for a computer for adapting a level of subscription to multicast sessions for receiving scalable data in a system comprising a server and at least one client, said server and said at least one client being linked by a communication network, this method comprising the following steps:

estimating the level of use of said communication network according to the method described above; and, in response to said step of estimating said level of use of said communication network, modifying the reception rate of said data stream by adapting said level of subscription to said multicast sessions.

The method according to the invention thus makes it possible to optimize the quality of the data received depending on the state of the communication network transmitting data. Thus, advantageously, if said communication network is under-used said client subscribes to a subscription to receive a higher scalability layer and if said communication network is congested said client abandons a subscription to a received scalability layer.

The invention also relates to a method for a computer for processing a scalable data stream, said scalable data stream comprising at least one message comprising at least one item of information characterizing a theoretical rate of said data stream, the method being implemented in a server and comprising the following steps:

estimating a theoretical instantaneous rate according to the quantity of data of said data stream to transmit during a period of predetermined length;

comparing the theoretical rate with said theoretical instantaneous rate; and, in response to said comparison, creating a message comprising said theoretical instantaneous rate if the difference between said theoretical rate and said theoretical instantaneous rate is greater than a predetermined threshold.

The method according to the invention thus makes it possible to facilitate and to improve the estimation of the level of use of the network on a client device by supplying the client device with the theoretical instantaneous rate estimated over a given period.

According to a particular embodiment, said data stream is a video stream, said theoretical rate being determined for the temporal frequency of the video sequence represented by said video stream.

The invention also relates to a computer program comprising instructions adapted for carrying out of each of the steps of the method described above when said program is executed on a computer, means for storing information, which may be removable or not, partially or totally readable by a computer or a microprocessor comprising code instructions of a computer program for the execution of each of the steps of the method described above as well as a device comprising means adapted for carrying out of each of the steps of the method described above.

The advantages procured by this computer program, by these storage means and by this device are similar to those referred to above.

BRIEF DESCRIPTION OF THE FIGURES

Other advantages, objects and features of the present invention will emerge from the following detailed description, given by way of non-limiting example, relative to the accompanying drawings in which:

FIGS. 4 and 5 illustrate examples of the change in the average rate observed and in the theoretical instantaneous rate relative to the theoretical average rate;

FIG. 7 illustrates an example of results produced by the algorithm illustrated in FIG. 6;

FIG. 8 illustrates a small difference between the theoretical average rate and the sum of the values of the parameter Max_bitrate_layer[i] for each layer received by a client, for which it is not necessary to calculate the theoretical average rate; and, FIG. 9 illustrates a high probability that a part of the bandwidth is available when a client has, in the past, estimated an average rate observed greater than the theoretical average rate, without identifying the start of congestion, enabling it to subscribe to a subscription to new multicast sessions.

DETAILED DESCRIPTION OF THE PREFERRED EMBODIMENTS

The following description concerns, by way of illustration, the transmission of a scalable video stream. However, the invention may be implemented with any other type of data, preferably scalable, transmitted from a server to a client via a communication network according to a mode of communication based on the subscription to multicast sessions. Although in the following description it is considered that each multicast session corresponds to one scalability layer, it can be otherwise. In particular, it is possible to implement the invention with a number of multicast sessions lower than the number of scalability layers.

Figure 1:
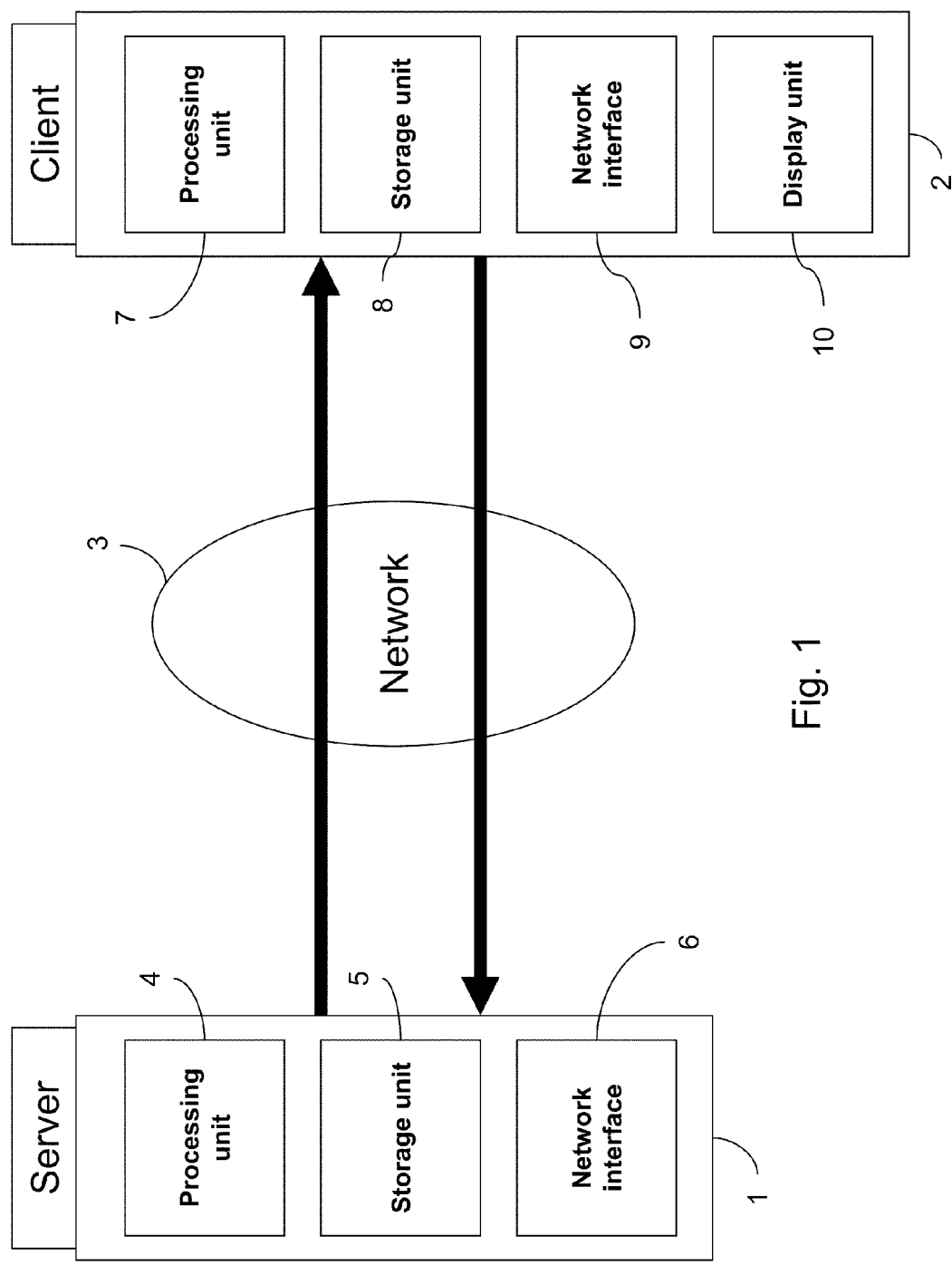
FIG. 1 is a diagram of a system for transmitting a video stream between a server and a client in a communication network.

FIG. 1 is a diagram of a system for transmitting a video stream between a server 1 and a client 2 via a communication network 3, for example an Ethernet network.

The server 1 here comprises a processing unit 4, also termed processor or CPU (acronym for Central Processing Unit) adapted to execute one or more programs. It also comprises a storage unit 5 and a network interface 6 which enables the server, in particular, to transmit data via the communication network 3. The data are advantageously transmitted using RTP (acronym for Real-Time Transport Protocol). The server may also comprise means for acquisition and for coding (not shown) for receiving a video stream from a source such as a camera and for transmitting it in the form of a scalable data stream.

The storage unit 5 makes it possible in particular to store data such as coded video data of SVC type.

It is considered here that the data are transmitted continuously in the form of an SVC stream using a mode of communication based on the subscription to multicast sessions, each spatial scalability layer being associated with a session. Furthermore, according to a preferred embodiment, the data are transmitted according to the temporal frequency of the sequence.

In similar manner, the client 2 comprises a processing unit 7 making it possible in particular to execute the program according to the invention, a storage unit 8, a network interface 9 adapted to receive the scalable data transmitted by the server and a display unit 10 such as a screen.

Figure 2:
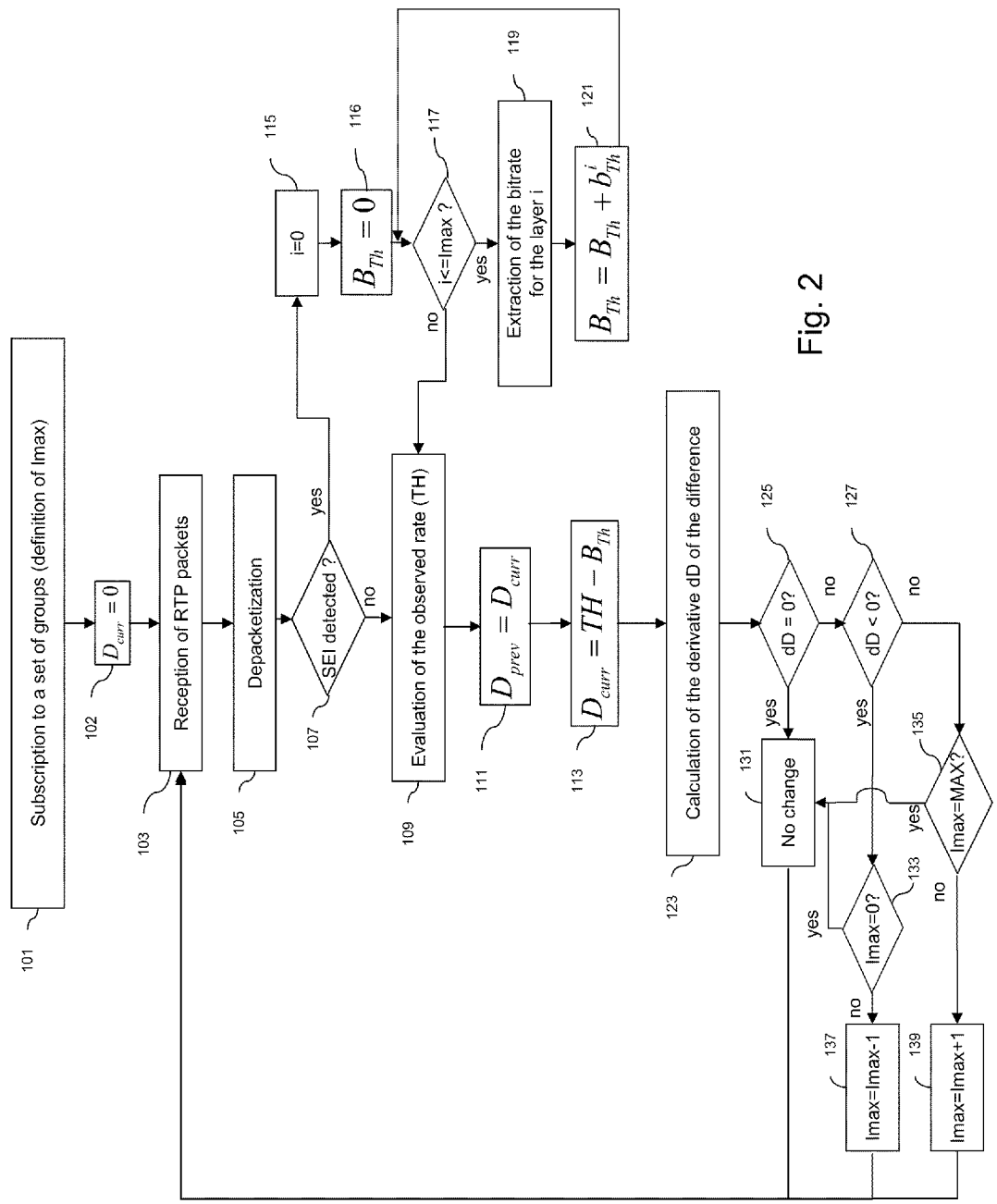
FIG. 2 illustrates an algorithm example, according to a first embodiment, for estimating the level of use of a network and the change in its capacities in order to adapt the behavior of a client to enable it, in particular, to subscribe or unsubscribe to multicast sessions.

FIG. 2 illustrates an algorithm example, according to a first embodiment, for estimating the level of use of a communication network and the change in its capacities in order to adapt the behavior of a client to enable it, in particular, to subscribe or unsubscribe to multicast sessions.

The object of a first step (step 101) is to subscribe the client to a set of multicast sessions. This set of sessions may correspond to the whole of or part of the multicast sessions with which the quality levels of the transmitted video stream are associated. This first step thus makes it possible to determine the variable Imax corresponding to the number of multicast sessions to which the client subscribes (with the exception of that corresponding to the basic stream), that is to say here to the number of scalability layers received (with the exception of the layer corresponding to the basic stream).

The variable $D_{curr}$, representing the difference between the average rate observed and the theoretical average rate, is initialized to the value zero (step 102).

The RTP packets are then received (step 103). This reception step may concern a single RTP packet or a predetermined number of RTP packets. Consequently, the following steps, referenced 103 to 139, are carried out for only one or for several RTP packets such that all the received packets are processed.

After having received at least one RTP packet, the NAL transported by that packet is extracted (step 105) and a test is carried out to determine whether the NAL corresponds to a scalability SEI message (step 107). It is considered here that the server always transmits at least one scalability SEI message per video sequence transmitted.

If the received packet corresponds to such a message, a variable i is initialized to zero (step 115) and a variable $B_{Th}$ representing the theoretical average rate of the sequence, according to the client's subscription, is also initialized to zero (step 116). A test is then carried out to determine whether the variable i is less than or equal to the variable Imax (step 117).

If the variable i is less than or equal to the variable Imax, the average rate corresponding to the layer having the index i is extracted from the scalability SEI message (step 119).

It is assumed here that the flag bitrate_info_present_flag [i] is always present for each layer. Consequently, the value Avg_bitrate[i] representing the average rate for the layer having the index i and the value Max_bitrate_layer[i] representing the maximum rate that may be used for the layer having the index i are always available for each scalability layer.

According to this embodiment, only the theoretical average rate associated with the layer having the index i, denoted $b_{Th}^i$, equal to the average rate indicated in the scalability SEI message ($b_{Th}^i$=Avg_bitrate[i]), is used to determine the theoretical average rate of the sequence ($B_{Th}$).

The theoretical average rate of the sequence, according to the client's subscription, is then obtained (step 121) by keeping a running total of the theoretical average rates associated with each layer. To that end, the index i is incremented by one and the preceding steps (steps 117 to 121) are repeated so long as the value of the variable i is less than or equal to that of the variable Imax. It should be noted here that, as stated above, since the video stream is transmitted according to the temporal frequency of the sequence, the theoretical average rate is in principle respected.

When the theoretical average rate has been evaluated, that is to say when the value of the index i is greater than that of the variable Imax, or if the received packet does not correspond to a scalability SEI message, the average rate observed, denoted TH (for throughput), is estimated (step 109). To estimate this value, the client keeps a running total of the size of the packets received over a predetermined time according to a mechanism based on a sliding window of length Δ, expressed here in seconds, of which the end corresponds to the present time. The running total size of the received packets is then divided by the length Δ of the sliding window to obtain the average rate observed TH.

The value of the variable $D_{curr}$ is then stored in a variable $D_{prev}$ (step 111) then the new value of the variable $D_{curr}$ is calculated (step 113). As described above, it corresponds to the difference between the average rate observed TH and the theoretical average rate of the sequence $B_{Th}$, according to the client's subscription.

To follow the change in this difference, the client then calculates its derivative, denoted dD, using the following relationship:

$$dD = \frac{D_{curr} - D_{prev}}{\delta}$$

where δ corresponds to the difference in time between the times at which the last two observed average rates were calculated.

The value of the derivative is then analyzed. According to this value, the client may decide to maintain its level of subscription, to subscribe to new subscriptions, or to abandon certain subscriptions.

If the value of the derivative is equal to zero (step 125), that is to say there is no variation between the theoretical average rate and the average rate observed, the client decides, preferably, to keep its level of subscription (step 131) since in this case, the level of use of the communication network by the client is adapted.

If the value of the derivative is less than zero (step 127), the client may deduce thereby that there is congestion or a start of congestion, that is to say a reduction in bandwidth. A test is then carried out (step 133) to determine whether the client is subscribed to several multicast sessions, that is to say whether the value of the variable Imax is equal to zero or not. If the client is subscribed to several multicast sessions, it may decide to give up the subscription relative to the multicast session corresponding to the highest scalability layer received (step 137). If the client is only receiving the basic stream, the client does not change its subscription (step 131).

If the value of the derivative is greater than zero, that is to say it is neither equal to nor less than zero, the client deduces thereby that the bandwidth is increasing and therefore that the network is under-used. The client may then potentially receive more data. A test is then carried out (step 135) to determine whether the client is subscribed to all the multicast sessions. To that end, the variable Imax is compared with a variable MAX corresponding to the number of multicast sessions to which the client may subscribe, with the exception of the one corresponding to the basic stream, that is to say the number of multicast sessions generated by the server, still with the exception of that corresponding to the basic stream. In the affirmative, the client does not change its subscription (step 131). If, on the contrary, the client is not subscribed to all the multicast sessions, it may subscribe to a new multicast session associated with a higher scalability layer (step 139).

The process is repeated so long as new packets are received, starting with step 103.

A limit to this first embodiment is linked to the use of an average value of theoretical rate concerning a sequence in its entirety. To be precise, variations may arise around this average value which may induce changes in the difference between the average rate observed and the theoretical average rate. Such changes may lead to erroneous interpretations whereby it is supposed that there is an increase or a reduction in bandwidth.

To avoid this phenomenon, it is possible to replace the calculation of the value of the theoretical average rate $B_{Th}$ by the calculation of a variable $B_{Th}^{i}$ corresponding to the value of the theoretical instantaneous rate. This value depends on the content of the portion of the video sequence considered for that calculation.

As described above, the value of the variable $B_{Th}$ is calculated over a period of time $\Delta$. As the server complies to the temporal frequency of the sequence, it always transmits the same quantity of images for each period $\Delta$. This may, for example, correspond to a GOP (acronym for Group Of Pictures) or to a set of consecutive GOPs. Thus, according to the content of the video sequence having a duration $\Delta$ (fast or slow motion, nature of textures, etc.), the theoretical instantaneous rate $B_{Th}^{i}$ varies around the theoretical average rate $B_{Th}$.

Figure 3:
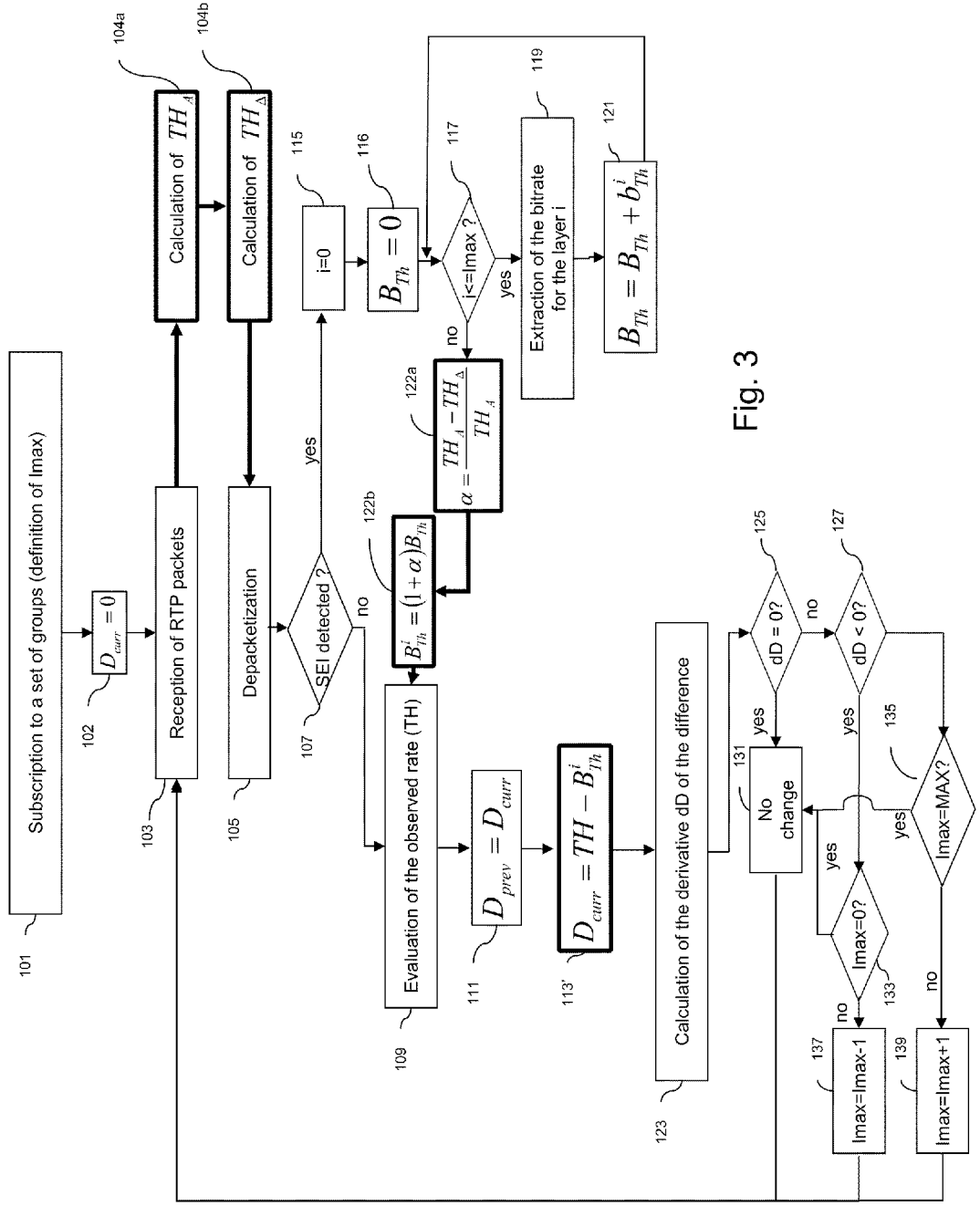
FIG. 3 illustrates a variant of the algorithm illustrated in FIG. 2 comprising in particular supplementary steps enabling the calculation to be made of a theoretical instantaneous rate in order to improve the estimation of the behavior of a network.

FIG. 3 illustrates a variant of the algorithm illustrated in FIG. 2 comprising in particular supplementary steps enabling the calculation to be made of a theoretical instantaneous rate in order to improve the estimation of the behavior of a communication network.

In addition to the steps described with reference to FIG. 2, comprising the same references, the algorithm here comprises the steps 104a, 104b, 122a and 122b. Furthermore, step 113 is modified.

Thus, to calculate the theoretical instantaneous rate $B_{Th}^{i}$, the algorithm comprises the steps 104a and 104b, executed after the steps of receiving RTP packets (step 103) and their analysis (step 105).

After having received one or more packets, the client calculates the overall average rate observed since the start of the reception of the video stream, termed $TH_A$ (step 104a). This step consists of keeping a running total of the size of the packets received since the start of that reception and of dividing the total by the time that has elapsed since then.

The client next calculates the average rate observed over a period $\Delta$, termed $TH_\Delta$ (step 104a). This step consists of keeping a running total of the size of all the packets received over this period $\Delta$ and of dividing the total obtained by the length of that period.

Moreover, after having calculated the theoretical average rate $B_{Th}$ (steps 117 to 121) and before calculating the average rate observed TH, the client calculates a correction factor termed $\alpha$ (step 122a), which may be a positive or negative value. It is for example calculated using the following relationship:

$$a = \frac{TH_A - TH_\Delta}{TH_A}$$

The theoretical instantaneous rate $B_{Th}^{i}$ is then estimated on the basis of the theoretical average rate $B_{Th}$ and of this correction factor $\alpha$ (step 122b), for example according to the following relationship:

$$B_{Th}^{i} = (1+\alpha)B_{Th}$$

If the correction factor $\alpha$ is positive, the theoretical instantaneous rate is greater than the theoretical average rate. Conversely, if the correction factor $\alpha$ is negative, the theoretical instantaneous rate is less than the theoretical average rate.

Step 113 has been modified (step 113') such that the variable $D_{curr}$ represents the difference between the observed rate TH and the theoretical instantaneous rate $B_{Th}^{i}$.

It should be noted here that other approaches may be used to determine the theoretical instantaneous rate $B_{Th}^{i}$. By way of illustration, the correction factor $\alpha$ may be estimated for each scalable layer processed. Another solution consists of taking into account the data received over the period $\Delta$ in order to estimate more precisely the data yet to be received.

It is also possible to compare the value of the derivative dD with predetermined thresholds in order to avoid, for example, changing the level of subscription of the client if that value, although different to zero, is substantially equal to zero. Thus, if that value is between a first and a second threshold, the client may decide not to change its level of subscription, if it is less than the lowest threshold, it may decide to give up a subscription and if it is above the highest threshold, it may decide to subscribe to a new subscription, if that is possible.

FIG. 4 illustrates a first example of the change in the average rate observed and in the theoretical instantaneous rate relative to the theoretical average rate. The x-axis here represents time whereas the y-axis represents the rate.

Reference 400 here concerns the average rate associated with the layer of index i, that is to say Avg_bitrate[i], while reference 405 concerns the maximum rate associated with the layer of index i, that is to say Max_bitrate_layer[i]. Reference 410 represents the change in the average rate observed TH and reference 415 represents the change in the theoretical instantaneous rate $B_{Th}^{i}$.

Up until the time denoted $t_1$, the difference between the average rate observed TH and the theoretical instantaneous rate $B_{Th}{}^i$ is substantially constant. It is thus not necessary for the client to change its level of subscription. Starting with the time $t_1$, the difference between these rates (in terms of absolute value) increases. By analyzing the behavior of this difference, the client may, at time $t_2$, with time $t_2$ following time $t_1$ in a period of time $\Delta$, detect a start of congestion. More precisely, as illustrated by the arrow referenced 420, the derivative dD here being negative, the client deduces therefrom that it must unsubscribe to a multicast session so as to no longer receive the data of the highest scalability layer received.

FIG. 5 illustrates a second example of the change in the average rate observed and in the theoretical instantaneous rate relative to the theoretical average rate. As for FIG. 4, the x-axis here represents time whereas the y-axis represents the rate. Similarly, references 400 and 405 here concern the average rate associated with the layer of index i, that is to say Avg_bitrate[i], and the maximum rate associated with the layer of index i, that is to say Max_bitrate_layer[i], respectively.

Reference 425 represents the change in the average rate observed TH and reference 430 represents the change in the theoretical instantaneous rate $B_{Th}{}^i$. As the difference between the average rate observed TH and the theoretical instantaneous rate $B_{Th}{}^i$ is constant here, the derivative dD is zero and, consequently, the client does not change its level of subscription.

The calculation of a theoretical instantaneous rate enables a value close to the real theoretical average rate to be obtained. However, another solution consists of ensuring that the theoretical average rate transmitted in the SEI scalability messages is representative of the transmission rate, that is to say, in other words, that the transmission rate only varies slightly relative to the theoretical average rate.

To ensure this characteristic, one solution consists of involving the server while maintaining its scalability capabilities. The idea here consists of transmitting new SEI messages as soon as a variation in the transmission rate is too great relative to the theoretical average rate. This solution enables the client to avoid calculating the theoretical instantaneous rate $B_{Th}{}^i$, the theoretical average rate being sufficient. This method may be implemented offline, during the analysis or the coding of the video sequence, or online, during the transmission of the video sequence.

Figure 6:
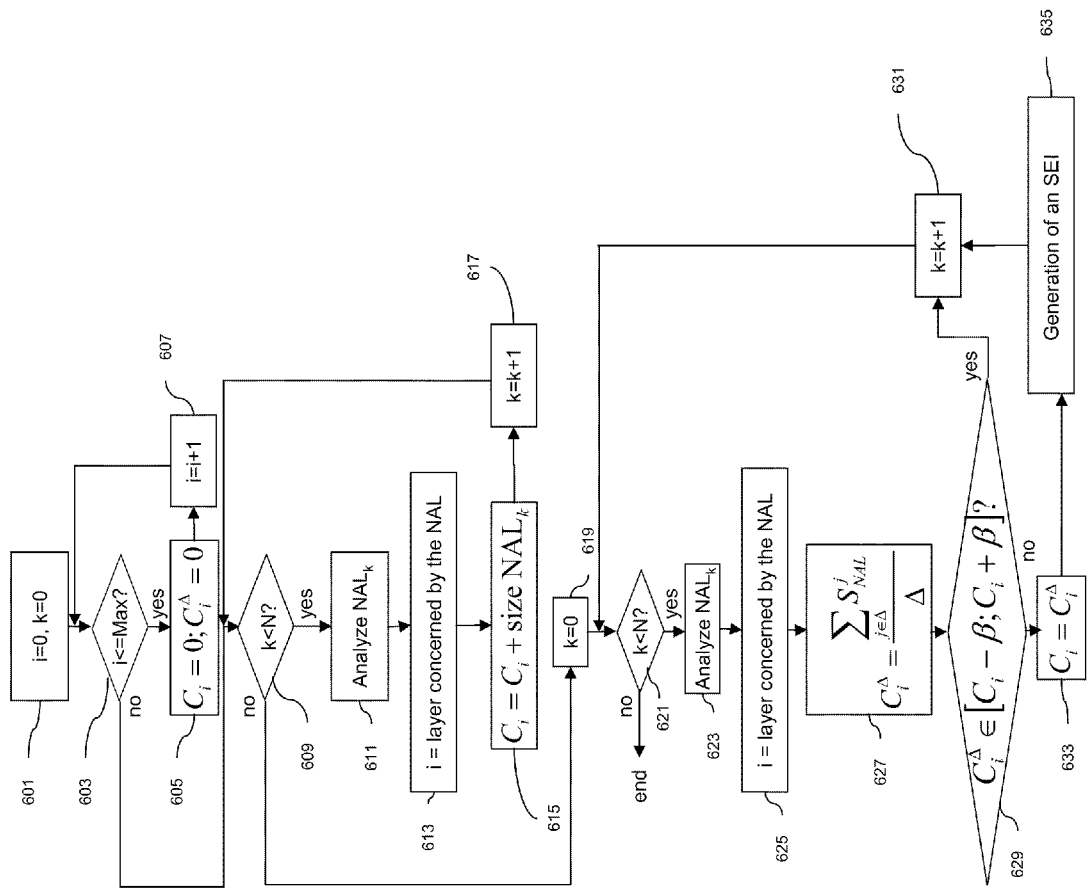
FIG. 6 illustrates an example of an algorithm which may be implemented by a server to evaluate high variations in the transmission rate relative to the theoretical average rate and to generate corresponding SEI messages.

FIG. 6 illustrates an example of an algorithm able to be implemented by a server to evaluate high variations in the transmission rate relative to the theoretical average rate and to generate corresponding SEI messages. This algorithm here is of offline type.

During an initialization phase, the server calculates a theoretical average rate for each scalability layer, for the whole sequence. To these ends, a first step consists of initializing the variables i and k to the value zero (step 601). A test is next conducted to determine whether all the spatial scalability layers have been processed (step 603), that is to say whether the value of the index i is less than or equal to that of the variable Max representing the number of spatial scalability layers, with the exception of that corresponding to the basic stream. If all the spatial scalability layers have not been processed, the variables $C_i$ and $C_i^\Delta$ are initialized to zero (step 605) and the index i is incremented by one (step 607), these two steps being repeated until all the spatial scalability layers have been processed.

The variable $C_i$ here represents the theoretical average rate for the layer of index i, for the whole sequence, whereas the variable $C_i^\Delta$ represents the theoretical average rate for the layer of index i, for a sliding window of length $\Delta$.

When all the spatial scalability layers have been processed, a test is carried out to determine whether all the NALs that contain the video sequence have been processed (step 609), that is to say whether the value of the variable k is less than that of the variable N which represents the number of NALs of the sequence.

If all the NALs have not been processed, the NAL having the index k is analyzed (step 611). This step consists in particular of extracting the header of the NAL to identify the parameter Did which determines the spatial scalability layer to which the NAL belongs. The value of the index i is then modified (step 613) to be equal to the index of the spatial scalability layer to which belongs the NAL (i=Did).

The size of the processed NAL is then added to the variable $C_i$ (step 615), the value of the index k is incremented by one (step 617) and the preceding steps (steps 609 to 617) are repeated until all the NALs have been processed.

When all the NALs have been processed, the value of the variable $C_i$ is divided by the duration of the sequence. This variable then represents the theoretical average rate for the sequence. The value of the index k is next initialized to zero (step 619) and a test is carried out to determine whether all the NALs have been processed (step 621), that is to say to determine whether the value of the index k is less than that of N.

The NAL of index k is then analyzed (step 623). Like step 611, this step consists in particular of extracting the header of the NAL to identify the parameter Did which determines the spatial scalability layer to which the NAL belongs. The value of the index i is then modified (step 625) to be equal to the index of the spatial scalability layer to which belongs the NAL (i=Did).

The value of the variable $C_i^\Delta$ for the layer of index i is then calculated on the basis of a sliding window corresponding to the period $\Delta$ ending on the NAL of index k (step 627) according to the following relationship, $$C_i^\Delta = \frac{\sum_{j \in \Delta} S_{NAL}^j}{\Delta}$$

where $S_{NAL}^j$ is the size of the $j^{th}$ NAL of the sliding window corresponding to the period $\Delta$ ending on the NAL of index k.

A test is then carried out to determine whether the value of the variable $C_i^\Delta$ belongs to the interval $[C_i-\beta;C_i+\beta]$ where $\beta$ represents an authorized difference relative to the theoretical average rate for the layer of index i (step 629). $\beta$ may in particular express a percentage of the variable $C_i$, for example 5%. If the value of the variable $C_i^\Delta$ belongs to the interval $[C_i-\beta;C_i+\beta]$, the value of the index k is incremented by one (step 631) and the preceding steps are repeated (starting with step 621) until all the NALs have been processed.

If the value of the variable $C_i^\Delta$ does not belong to the interval $[C_i-\beta;C_i+\beta]$, it is considered that the theoretical average rate for the layer of index i, for a sliding window having a period $\Delta$, $C_i^\Delta$, is too different from the theoretical average rate for the layer of index i, for the whole of the sequence, $C_i$. Consequently, the variable $C_i$ takes the value of the variable $C_i^\Delta$ (step 633) and a new scalability SEI message is generated in the stream, before the first NAL of the sliding window corresponding to the period $\Delta$ and ending on the NAL having the index k (step 635). In this SEI message, the parameter Avg_bitrate[i] takes as its value that of the variable $C_i$. The value of the index k is next incremented by one (step 631) and the preceding steps are repeated (starting with step 621) until all the NALs have been processed.

If, for the layer of index i, for a sliding window of period Δ, several changes in theoretical average rate occur for several layers of the same sliding window, a single scalability SEI message is generated.

It should be noted that at the start of the process, steps 629 to 631 are only carried out when the number of NALs processed attains the number of NALs included in the sliding window of length Δ.

A representation of the results produced by the algorithm illustrated in FIG. 6 is given in FIG. 7. In this representation, the parameter Max_bitrate_layer[i] is re-evaluated for each period Δ.

As for FIGS. 4 and 5, the x-axis here represents time whereas the y-axis represents the rate. References 700 and 705 here concern the average rate associated with the layer of index i, that is to say Avg_bitrate[i], and the maximum rate associated with the layer of index i, that is to say Max_bitrate_layer[i], respectively. Reference 710 designates the real transmission rate.

As illustrated, the values of the average rate that is associated with the layer of index i, Avg_bitrate[i], and of the maximum rate associated with the layer of index i, Max_bitrate_layer[i], are adapted according to the real transmission rate. Thus, it is not necessary, for the client, to calculate the theoretical instantaneous rate $B_{Th}^i$.

Reference 715 indicates the times at which the SEI scalability messages enabling the client to adapt its subscriptions according to the available bandwidth are transmitted.

Whereas, according to the embodiment described with reference to FIG. 3, the theoretical instantaneous rate is always calculated for each sliding window of length Δ, it is possible to avoid performing this calculation in all cases by using the parameter Max_bitrate_layer[i], available in the scalability SEI messages. To be precise, if the theoretical average rate and the maximum rate are quite close to each other, the variations in the theoretical instantaneous rate are low. In this case, the variance of the variations is low. Thus, as illustrated in FIG. 8, when the difference between the theoretical average rate $B_{Th}$ and the sum of the values of the parameter Max_bitrate_layer[i] for each layer received by the client is low, that is to say less than a predetermined threshold, it is not necessary to calculate the theoretical instantaneous rate $B_{Th}^i$.

As for FIGS. 4, 5 and 7, the x-axis here represents time whereas the y-axis represents the rate. References 800 and 805 concern the average rate associated with the layer of index i, that is to say Avg_bitrate[i], and the maximum rate associated with the layer of index i, that is to say Max_bitrate_layer[i], respectively. Reference 810 designates the real transmission rate.

As illustrated, it is not necessary to calculate the theoretical instantaneous rate $B_{Th}^i$ since the theoretical variations are limited.

According to the first embodiment described with reference to FIG. 2, the client detects an increase in the bandwidth when the derivative of the difference between the average rate observed and the theoretical average rate is positive, that is to say when the average rate observed increases relative to the theoretical average rate. In reality, there is little chance that the average rate observed will increase relative to the theoretical average rate when the server is transmitting the data stream with a transmission rate linked to the temporal frequency of the transmitted video sequence.

To improve the detection of the increase in bandwidth according to this embodiment, one solution consists of involving the server and of detecting, in the client, a stable state over a period of time of which the length is greater than the period Δ used. A stable state is identified here by analyzing several successive values of the derivative. If these values are equal to zero, or close to zero, the client considers that the state is stable. This situation occurs in particular when the level of subscriptions of the client uses all or part of the available bandwidth.

In this case, the client can send a message to the server to indicate that it is in a stable state. In response, the server progressively increases the transmission rate by transmitting the data at a rate higher than the temporal frequency of the transmitted sequence. If this increase does not lead to congestion, the client can subscribe to a new multicast session associated with a higher scalability layer. When the client subscribes to such a subscription, it sends another message to the server to indicate this to it. In response, the server re-adapts the transmission rate compatible with the temporal frequency of the transmitted sequence. If, on the contrary, this increase leads to a start of congestion, the client transmits a message to the server to indicate this. In response, the server re-adapts the transmission rate according to the temporal frequency of the transmitted sequence.

To avoid involving the server, the client may, when it identifies a stable state, analyze the behavior of the average rate observed over the past time. If, in the past time, that is to say over at least one past period of time, the client has estimated an average rate observed greater than the theoretical average rate, without identifying any start of congestion, that is to say that the theoretical instantaneous rate was consistent with the average rate observed, it may thereby deduce that there is a high probability that a part of the bandwidth is available, and thus that the communication network is in a state of under-use. In this case, the client may decide to subscribe to a subscription to new multicast sessions in order to access a higher layer of scalability.

FIG. 9 illustrates such a situation.

As for FIGS. 4, 5, 7 and 8, the x-axis here represents time whereas the y-axis represents the rate. References 900 and 905 concern the average rate associated with the layer of index i, that is to say Avg_bitrate[i], and the maximum rate associated with the layer of index i, that is to say Max_bitrate_layer[i], respectively.

References 910 and 915 designate the average rate observed and the theoretical average rate, respectively. As illustrated, the difference is substantially constant, and, consequently, the derivative of the difference is substantially equal to zero. Thus, between the times $t_1$ and $t_2$, the state is stable. Moreover, it is observed over this period that the average rate observed may be increased. The client may, at time $t_2$, subscribe to a subscription to new multicast sessions to access a higher layer of scalability.

Naturally, to satisfy specific needs, a person skilled in the art will be able to make amendments to the preceding description.

The invention claimed is:

1. A method for a computer for estimating a level of use of a communication network linking a server and at least one client, the method implemented by the at least one client, comprising steps of:

obtaining at least one metadata from a data stream transmitted over the communication network at a transmission rate corresponding to a temporal frequency of the data stream, the metadata characterizing a theoretical rate of the data stream based on the transmission rate of the data stream;

obtaining the theoretical rate from the data stream metadata;

evaluating a first and a second real reception rate of the data stream, the first and second real reception rates corresponding to rates at which the data stream is received by the at least one client over a first and a second time period, respectively;

comparing the theoretical rate and the evaluated rates, including analyzing an evolution of a difference between the theoretical rate and each of the evaluated rates, wherein the evolution is determined by computing a derivative representative of a change between the difference of the theoretical rate with the first real reception rate and the difference of the theoretical rate with the second real reception rate, and the evolution of the difference between the theoretical rate and each of the evaluated rates characterizes an adapted level of use of the communication network, under-use of the communication network, or congestion of the communication network; and estimating the level of use of the communication network based on a result obtained in the comparing step, wherein the data stream is a scalable data stream and the theoretical rate is determined according to a theoretical rate associated with each scalability layer of the data stream.

2. A method according to claim 1 further comprising a step of correcting said at least one metadata characterizing said theoretical rate of said data stream.

3. A method according to claim 2 in which said correcting step further comprises a step of estimating, for a predetermined period of time, a theoretical instantaneous rate based on content of the data stream received during the predetermined period of time.

4. A method according to claim 2, which the correcting step is only carried out when a variance in a change of the theoretical rate is greater than a predetermined threshold.

5. A method according to claim 1, further comprising step of:

determining a state of the at least one client according to a variation in a difference between the theoretical rate and each of the evaluated rates and according to a variation in a number of the scalability layers of the data stream received by the at least one client; and transmitting an indication of the state of the at least one client to the server when the state of the at least one client is stable in order to request the server to increase the transmission rate of said data stream.

6. A method according to claim 5, wherein the increased transmission rate of the data stream is greater than the transmission rate corresponding to the temporal frequency of said data stream.

7. A method according to claim 6, further comprising step of:

analyzing a change in the evaluated rates and determining under-use of the communication network based on an analysis of the state of the at least one client and on said analysis of the change of the evaluated rates.

8. A method according to claim 1 further comprising step of:

determining a state of the at least one client according to a variation in a difference between the theoretical rate and the evaluated rates and according to a variation in a number of the scalability layers of the data stream received by the at least one client;

comparing, when the state of the at least one client is stable, the theoretical rate with at least one reception rate of the data stream evaluated over at least one past period of time; and, determining, when the at least one reception rate of the data stream evaluated over at least one past period of time is greater than the theoretical rate, under-use of the communication network.

9. A method for a computer for adapting a level of subscription to multicast sessions for receiving scalable data in a system including a server and at least one client, the server and the at least one client being linked by a communication network, the method comprising steps of:

estimating a level of use of the communication network according to claim 1; and modifying a reception rate of the data stream by adapting the level of subscription to the multicast sessions based on a result obtained in the estimating step.

10. A method according to claim 9, wherein when the communication network is under-used, the client subscribes to a subscription to receive a higher-scalability layer, and when the communication network is congested, the client abandons a subscription to a received scalability layer.

11. A method according to claim 1, wherein the data stream is a video stream, and a theoretical rate determined for a temporal frequency of a video sequence is represented by the video stream.

12. A method for a computer for processing a scalable data stream, the scalable data stream having at least one message that includes at least one metadata characterizing a theoretical rate of the scalable data stream based on a transmission rate of the scalable data stream, the transmission rate corresponding to a temporal frequency of the scalable data stream, the method comprising steps of:

estimating a first and a second theoretical instantaneous rate according to a quantity of data of part of the scalable data stream transmitted during a first and a second period of time, respectively, shorter than a period of time to transmit all of the scalable data stream;

comparing the theoretical rate with the theoretical instantaneous rates, including analyzing an evolution of a difference between the theoretical rate and each of the theoretical instantaneous rates, wherein the evolution is determined by computing a derivative representative of a change between the difference of the theoretical rate with the first theoretical instantaneous rate and the difference of the theoretical rate with the second theoretical instantaneous rate, and the evolution of the difference between the theoretical rate and each of the theoretical instantaneous rates characterizes an adapted level of use of the communication network, under-use of the communication network, or congestion of the communication network; and creating a message including the theoretical instantaneous rate when the evolution of the difference between the theoretical rate and each of the theoretical instantaneous rates is greater than a predetermined threshold.

13. A non-transitory computer-readable storage medium storing a program that when executed caused a computer to perform a method of estimating a level of use of a communication network linking a server and at least one client, the method implemented by the at least one client, comprising steps of:

obtaining at least one metadata from a data stream transmitted over the communication network at a transmission rate corresponding to a temporal frequency of the data stream, the metadata characterizing a theoretical rate of the data stream based on the transmission rate of the data stream;

obtaining the theoretical rate from the data stream metadata;

evaluating a first and a second real reception rate of the data stream, the first and second real reception rates corresponding to rates at which the data stream is received by the at least one client over a first and a second time period, respectively;

comparing the theoretical rate and the evaluated rates, including analyzing an evolution of a difference between the theoretical rate and each of the evaluated rates, wherein the evolution is determined by computing a derivative representative of a change between the difference of the theoretical rate with the first real reception rate and the difference of the theoretical rate with the second real reception rate, and the evolution of the difference between the theoretical rate and each of the evaluated rates characterizes an adapted level of use of the communication network, under-use of the communication network, or congestion of the communication network; and estimating the level of use of the communication network based on a result obtained in the comparing step, wherein the data stream is a scalable data stream and the theoretical rate is determined according to a theoretical rate associated with each scalability layer of the data stream.

14. A device for estimating a level of use of a communication network linking a server and at least one client, the device implemented by the at least one client, comprising a computer processor coupled to a memory, the computer processor being programmed to function as at least:

an obtaining unit configured to obtain at least one metadata from a data stream transmitted over the communication network at a transmission rate corresponding to a temporal frequency of the data stream, the metadata characterizing a theoretical rate of the data stream based on the transmission rate of the data stream and to obtain the theoretical rate from the data stream metadata;

an evaluating unit configured to evaluate a first and a second real reception rate of the data stream, the first and second real reception rates corresponding to rates at which the data stream is received by the at least one client over a first and a second time period, respectively;

a comparing unit configured to compare the theoretical rate and the evaluated rates, including analyzing an evolution of a difference between the theoretical rate and each of the evaluated rates, wherein the evolution is determined by computing a derivative representative of a change between the difference of the theoretical rate with the first real reception rate and the difference of the theoretical rate with the second real reception rate, and the evolution of the difference between the theoretical rate and each of the evaluated rates characterizes an adapted level of use of the communication network, under-use of the communication network, or congestion of the communication network; and an estimating unit configured to estimate the level of use of the communication network based on a result obtained by the comparing unit, wherein the data stream is a scalable data stream and the theoretical rate is determined according to a theoretical rate associated with each scalability layer of the data stream.

15. A device according to claim 14, wherein the computer processor is further programmed to function as a correcting unit configured to correct the at least one metadata characterizing the theoretical rate of the data stream.

16. A device according to claim 15, wherein the correcting unit further includes an estimating unit configured to estimate, for a predetermined period of time, a theoretical instantaneous rate based on content of the data stream received during the predetermined period of time.

17. A device according to claim 15, wherein the computer processor is further programmed to function as:

a determining unit configured to determine a state of the at least one client according to a variation in the difference between the theoretical rate and the evaluated rates and according to a variation in a number of the scalability layers of the data stream received by the at least one client; and a transmitting unit configured to transmit an indication of the state of the at least one client to the server when the state of the at least one client is stable in order to request the server to increase the transmission rate of the data stream.

18. A device according to claim 17, wherein the computer processor is further programmed to function as:

an analyzing unit configured to analyze a change in the evaluated rates; and a second determining unit configured to determine under-use of the communication network according to an analysis of the state of the at least one client and an analysis of the change of the evaluated rates.

19. A device according to claim 15, wherein the computer processor is further programmed to function as:

a determining unit configured to determine a state of the at least one client according to a variation in the difference between the theoretical rate and the evaluated rates and according to a variation in a number of the scalability layers of the data stream received by the at least one client;

a comparing unit configured to compare, when the state of the at least one client is stable, the theoretical rate with at least one reception rate of the data stream evaluated over at least one past period of time; and a determining unit configured to determine, when the at least one reception rate of the data stream evaluated over at least one past period of time is greater than the theoretical rate, under-use of the communication network.

20. A device for adapting a level of subscription to multicast sessions for receiving scalable data in a system including a server and at least one client, the server and the at least one client being linked by a communication network, the device comprising a computer processor coupled to a memory, the computer processor being programmed to function as at least:
- an estimating unit configured to estimate a level of use of the communication network, the estimating unit including an obtaining unit configured to obtain the theoretical rate of the data stream;
- an evaluating unit configured to evaluate a first and a second real reception rate of the data stream, the first and second real reception rates corresponding to rates at which the data stream is received by the at least one client over a first and a second time period, respectively;
- a comparing unit configured to compare the theoretical rate and the evaluated rates, including analyzing an evolution of a difference between the theoretical rate and each of the evaluated rates, wherein
- the evolution is determined by computing a derivative representative of a change between the difference of the theoretical rate with the first real reception rate and the difference of the theoretical rate with the second real reception rate, and
- the evolution of the difference between the theoretical rate and each of the evaluated rates characterizes an adapted level of use of the communication network, under-use of the communication network, or congestion of the communication network,
- an estimator configured to estimate the level of use of the communication network based on a result obtained by the comparing unit; and
- a modifying unit configured to modify a reception rate of a data stream by adapting the level of subscription to the multicast sessions according to the level of use of the communication network, wherein
- the data stream is a scalable data stream and the theoretical rate is determined according to a theoretical rate associated with each scalability layer of the data stream.

21. A device for processing a scalable data stream, the scalable data stream having at least one message that includes at least one metadata characterizing a theoretical rate of the scalable data stream based on a transmission rate of the scalable data stream, the transmission rate corresponding to a temporal frequency of the scalable data stream, the device comprising a computer processor coupled to a memory, the computer processor being programmed to function as at least:
- an estimating unit configured to estimate a first and a second theoretical instantaneous rate according to the quantity of data of the scalable data stream transmitted during a first and a second period of time, respectively, shorter than a period of time to transmit all of the scalable data stream;
- a comparing unit configured to compare the theoretical rate with the theoretical instantaneous rates, including analyzing an evolution of a difference between the theoretical rate and each of the theoretical instantaneous rates, wherein
- the evolution is determined by computing a derivative representative of a change between the difference of the theoretical rate with the first theoretical instantaneous rate and the difference of the theoretical rate with the second theoretical instantaneous rate, and
- the evolution of the difference between the theoretical rate and each of the theoretical instantaneous rates characterizes an adapted level of use of the communication network, under-use of the communication network, or congestion of the communication network; and
- a creating unit configured to create a message including the theoretical instantaneous rate when the evolution of the difference between the theoretical rate and each of the theoretical instantaneous rates is greater than a predetermined threshold.

22. A non-transitory computer-readable storage medium storing a program that when executed causes a computer to perform a method for processing a scalable data stream, the scalable data stream having at least one message that includes at least one metadata characterizing a theoretical rate of the scalable data stream based on a transmission rate of the scalable data stream, the transmission rate corresponding to a temporal frequency of the scalable data stream, the method comprising steps of:
- estimating a first and a second theoretical instantaneous rate according to the quantity of data of the scalable data stream transmitted during a first and a second period of time, respectively, shorter than a period of time to transmit all of the scalable data stream;
- comparing the theoretical rate with the theoretical instantaneous rates, including analyzing an evolution of a difference between the theoretical rate and each of the theoretical instantaneous rates, wherein
- the evolution is determined by computing a derivative representative of a change between the difference of the theoretical rate with the first theoretical instantaneous rate and the difference of the theoretical rate with the second theoretical instantaneous rate, and
- the evolution of the difference between the theoretical rate and each of the theoretical instantaneous rates characterizes an adapted level of use of the communication network, under-use of the communication network, or congestion of the communication network; and
- creating a message including the theoretical instantaneous rate when the evolution of the difference between the theoretical rate and each of the theoretical instantaneous rates is greater than a predetermined threshold.

* * * * *